United States Patent

[11] 3,602,126

| | | |
|---|---|---|
| [72] | Inventor | Werner Breitschwerdt<br>Stuttgart-Botnang, Germany |
| [21] | Appl. No. | 826,438 |
| [22] | Filed | May 21, 1969 |
| [45] | Patented | Aug. 31, 1971 |
| [73] | Assignee | Daimler-Benz Aktiengesellschaft<br>Stuttgart-Unterturkheim, Germany |
| [32] | Priority | May 22, 1968 |
| [33] | | Germany |
| [31] | | P 17 55 559.8 |

[54] HEATING AND VENTILATION INSTALLATION FOR A MOTOR VEHICLE
5 Claims, 3 Drawing Figs.

[52] U.S. Cl. .................................................. 98/2 C, 98/2 F
[51] Int. Cl. .................................................. B60h 1/24
[50] Field of Search ........................................... 98/2, 2.2, 2.4, 2.5, 2.6; 62/244

[56] References Cited
UNITED STATES PATENTS

| 2,150,110 | 3/1939 | Strauss | 98/2 |
| 2,391,408 | 12/1945 | Galaub | 98/2 |
| 2,523,923 | 9/1950 | Rodert | 98/2 |

Primary Examiner—Meyer Perlin
Attorney—Craig, Antonelli, Stewart & Hill

ABSTRACT: A heating and ventilation installation for a motor vehicle in which the inner covering of the door and body sidewalls consists of a tough and hard foamed material which itself forms two channels provided, respectively, with upwardly and downwardly directed openings.

PATENTED AUG 31 1971
3,602,126
FIG.1
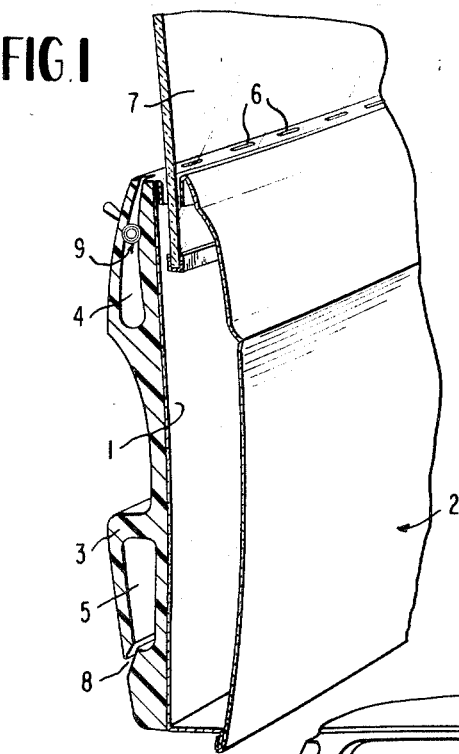
FIG.2
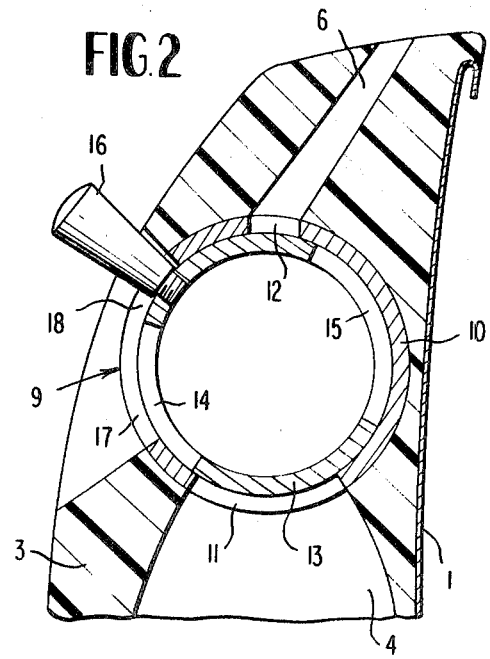
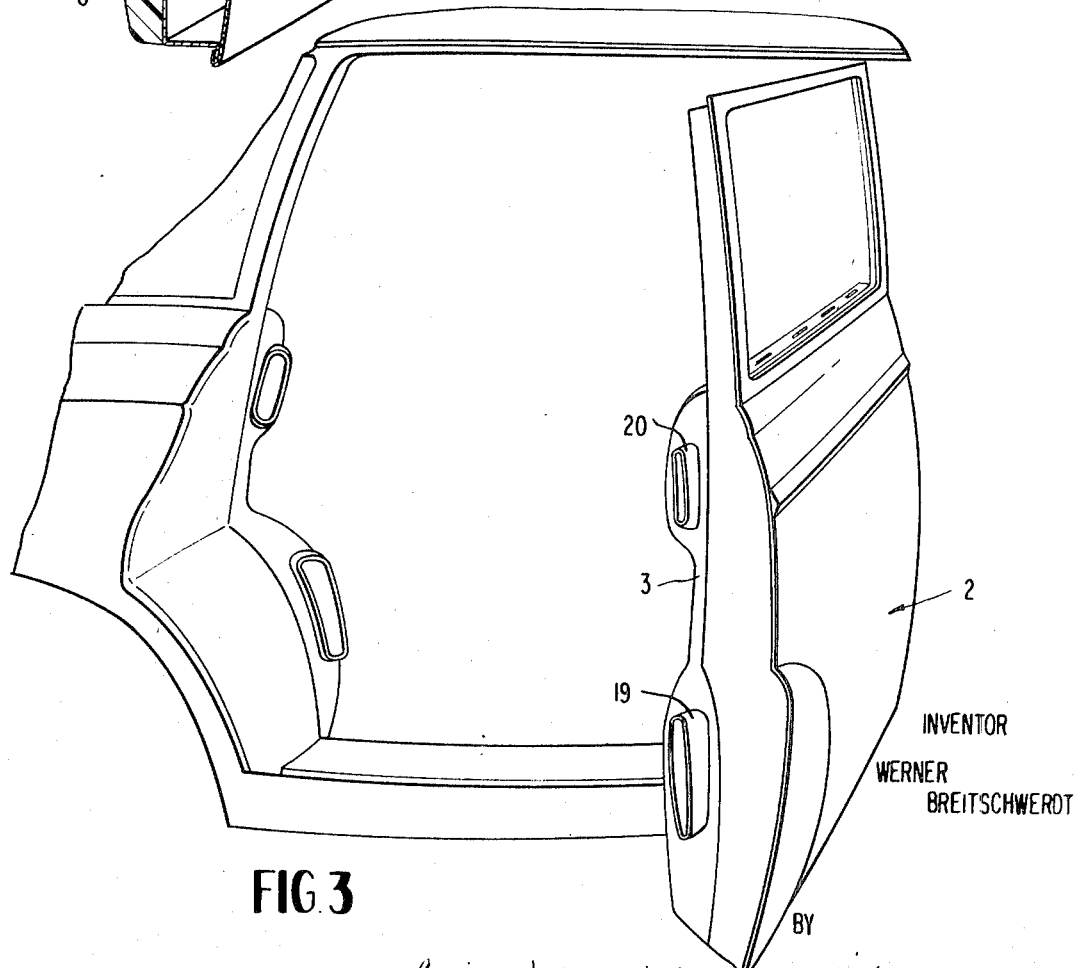
FIG.3
INVENTOR
WERNER BREITSCHWERDT
BY Craig, Antonelli, Stewart & Hill ATTORNEYS

HEATING AND VENTILATION INSTALLATION FOR A MOTOR VEHICLE

The present invention relates to a heating and ventilating installation for a motor vehicle, in which a part of the heated air or fresh air flows through channels provided in or at the doors and/or the other sidewalls of the vehicle body and from there, through apertures both upwardly in the direction toward the windows of the glass-enclosed top as also downwardly into the foot space of the vehicle body.

The present invention is concerned with improving and reducing the costs of the arrangement of the channels provided in or at the door or other sidewalls of the vehicle body. The underlying problems are solved in accordance with the present invention in that the channels are arranged in an interior covering of the doors and/or of the other sidewalls of the vehicle body consisting of a tough and hard foamed material of preferably greater thickness and are formed by the foamed material itself.

Costly channel installations are avoided by the present invention. Furthermore, it is achieved by the present invention that the effect of the foamed material of the inner covering or facing, offering already as such an impact protection in case of an accident, is enhanced by the arrangement of the channels in the foamed material. In an advantageous construction of the present invention, two channels each may be arranged in an inner covering or facing, of which one, provided with upwardly directed apertures is located below the window of the glass-enclosed top and the other provided with apertures directed toward the sides, is located above the vehicle body floor.

A closure mechanism may be arranged in the upper channel upstream of the upwardly directed apertures, and this closure mechanism may consist of a pipe-shaped rotary slide valve which is adapted to be actuated by means of a lever protruding into the vehicle body.

Accordingly, it is an object of the present invention to provide a heating and ventilation installation for a motor vehicle which eliminates by simple means the aforementioned shortcomings and drawbacks encountered heretofore.

Another object of the present invention resides in a heating and ventilation installation for a motor vehicle which minimizes the costs, particularly as regards the manufacture and installation of air ducts.

A further object of the present invention resides in a heating and ventilation installation for a motor vehicle which further contributes to the safety of the passengers.

These and further objects, features and advantages of the present invention will become more obvious from the following description when taken in connection with the accompanying drawing which shows, for purposes of illustration only, one embodiment in accordance with the present invention, and wherein:

FIG. 1 is a cross section through a motor vehicle door, on an enlarged scale, with the door shown in perspective;

FIG. 2 is an enlarged cross-sectional view through the upper area of the door covering in accordance with the present invention; and FIG. 3 is a partial side view of a motor vehicle with opened door in accordance with the present invention.

Referring now to the drawing wherein like reference numerals are used throughout the various views to designate like parts, and more particularly to FIG. 1, the covering or facing 3 is arranged at the inner sidewall 1 of the motor vehicle door generally designated by reference numeral 2. The cover 3 consists of a tough and hard foamed material of any known type of relatively large thickness and extends from the glass-enclosed top to the lower door edge.

For purposes of heating and ventilation with air, the two channels 4 and 5 are arranged in the cover 3, disposed to extend approximately in the horizontal direction, which are connected (not shown) with a conventional heating and ventilation installation. The channel 4 is located in the upper area of the covering 3 and slot-shaped openings lead from the channel 4 in the upward direction up to the window sill so that the windowpane 7 can be swept with air.

The channel 5 is disposed in the lower area of the covering 3. Apertures 8 lead from the channel 5 obliquely downwardly into the foot space of the vehicle body.

No closure means are provided for the apertures 8 of the channel 5. In contrast thereto, as can be seen from FIG. 1 and particularly from FIG. 2, the closure mechanism generally designated by reference numeral 9 is provided for the apertures 6 of the channel 4. This closure mechanism 9 consists of the pipe 10 foamed-in into the cover 3 at the transition from the channel 4 to the slot-shaped apertures 6 in the cover 3, which is provided with an opening 11 in the direction toward the channel 4 and with openings 12 in the direction toward the slot-shaped apertures 6. The pipe-shaped rotary slide valve 13 is arranged in the pipe 10 which is provided with the openings 14 and 15. The rotary slide valve 13 can be actuated by means of a lever 16 which projects through the slot 17 in the pipe 10 and through the opening 18 in the cover 3 into the vehicle body.

In the position of the rotary slide valve 13 illustrated in FIG. 2, the openings 11 and 12 in pipe 10 are closed. No air can be blown out of the channel 4 against the windowpane 7. If, however, it is necessary to eliminate a condensation at the windowpane or to supply the same with warm air, then the rotary slide valve 13 is so rotated by means of the lever 16 that the openings 11 and 14 coincide with the openings 12 and 15.

As shown in FIG. 3, transfer connections or pipes 19 and 20 are added and connected to the cover 3 at the end of the door. Similar transfer pipes are disposed in the extensions of the channels in the fixed sidewalls of the body adjoining the door 2, which sidewalls are equipped in a similar manner as the door 2 with a covering or interior facing having channels for the heating and ventilation system arranged herein.

While I have shown and described only one embodiment in accordance with the present invention,, it is understood that the same is not limited thereto but is susceptible of numerous changes and modifications as known to a person skilled in the art. For example, any suitable foamed material made from, for example, synthetic resinous material suitably foamed in a conventional manner and possessing the requisite properties of being partially reversibly deformed under normal pressure with cellular fabric collapsing under overloads, may be used with the present invention. Examples of such materials are foamed polyurethane, homogeneous polystyrene, sintered polystyrene, unmodified and modified polyvinyl chloride, etc. Consequently, I do not wish to be limited to the details shown and described herein but intend to cover all such changes and modifications as are within the scope of those skilled in the art.

I claim:

1. A heating and ventilating installation for a motor vehicle wherein a portion of air flows through channels arranged in an inner cover means secured to at least one of the vehicle portions comprising the door and other sidewalls and flows from there through apertures both upwardly toward the windows of the glass-enclosed top and also downwardly into the foot space of the vehicle body, characterized in that the inner cover means consists of tough and hard foamed material of substantial thickness, and said channels being formed by the foamed material itself.

2. An installation according to claim 1, characterized in that at least two channels each are arranged in an inner cover means, of which one channel is located below the window of a glass-enclosed top and provided with upwardly directed aperture means while the other channel is located above the vehicle floor and provided with aperture means directed toward the sides.

3. An installation according to claim 2, characterized in that a closure means is arranged in the upper channel, upstream of the upwardly directed aperture means.

4. An installation according to claim 3, characterized in that the closure means include a tube-shaped rotary slide valve means adapted to be actuated by a lever protruding into the vehicle body.

5. An installation according to claim 4, characterized in that the closure means is foamed-in into the cover means.